United States Patent [19]

Murray

[11] Patent Number: 4,712,492
[45] Date of Patent: Dec. 15, 1987

[54] IMPLEMENT POSITION ADJUSTING DEVICE

[75] Inventor: David L. Murray, Lee's Summit, Mo.

[73] Assignee: Deutz-Allis Corporation, Milwaukee, Wis.

[21] Appl. No.: 912,961

[22] Filed: Sep. 29, 1986

[51] Int. Cl.⁴ ............................................. A01C 5/06
[52] U.S. Cl. ..................................... 111/88; 172/423; 172/430; 172/576; 403/3; 403/364; 411/535
[58] Field of Search .................................. 111/52-58, 111/59, 60, 61, 85-88; 403/3, 4, 364, 405, DIG.9; 74/10.15, 10.2, 10.41, 524, 527, 533; 172/423, 430, 575-576, 603, 742, 763; 411/535; 384/626

[56] References Cited

U.S. PATENT DOCUMENTS

| 1,386,317 | 8/1921 | Claassen | 411/535 |
| 1,627,277 | 5/1927 | Craig | 172/603 X |
| 1,940,278 | 12/1933 | Walker | 411/535 |
| 2,405,889 | 8/1946 | Kennedy | 411/535 |
| 3,022,099 | 2/1962 | Bruscaglioni | 403/4 |
| 3,830,484 | 8/1974 | Bright et al. | 411/535 X |
| 4,256,211 | 3/1981 | Katkov | 411/535 X |
| 4,273,057 | 6/1981 | Pollard | 111/88 |
| 4,374,500 | 2/1983 | Westerfield | 111/88 |
| 4,430,952 | 2/1984 | Murray | 111/88 X |
| 4,433,879 | 2/1984 | Morris | 411/535 |

Primary Examiner—James R. Feyrer
Attorney, Agent, or Firm—Charles L. Schwab

[57] ABSTRACT

An adjusting device permitting the operator of a planter to easily and accurately adjust the depth of planting by vertically adjusting the height of the planter frame through use of an adjustable spacer device in the support for the gauge wheels. The adjustable spacer has two main parts, one of which has a multiple series of axially spaced steps affording selective adjustment of the planter frame relative to the ground.

8 Claims, 7 Drawing Figures

IMPLEMENT POSITION ADJUSTING DEVICE

TECHNICAL FIELD

This invention relates to a device for adjusting an implement frame relative to the ground and more particularly to a manually operable adjusting device affording a plurality of stepped operating positions.

PRIOR ART STATEMENT

My U.S. Pat. No. 4,430,952, issued Feb. 14, 1984, entitled "Planter Gauge Wheels with Adjustable Equalizer Mechanism" shows gauge wheels rotatably mounted on walking beams whose ends are connected to an equalizing mechanism including a cable and a vertically adjustable pulley. The pulley is supported by a clevis having an upwardly extending threaded shank extending through a vertical opening in the planter frame and on which a handwheel is threadedly engaged. A stabilizer bar welded to the clevis extends through a vertical slot along which gauge marks are placed. The position of the stabilizer bar relative to the gauge marks indicates the depth of planting. In use it was found that under certain operating conditions, the handwheel would rotate and cause the depth of planting to change. In other conditions of operation, the threaded connection between the handwheel and the clevis becomes jammed because of dirt or rust and the handwheel could not be turned by hand.

Also, heretofore, the depth of earth working tools has been adjusted by providing a plurality of vertically spaced transverse holes in the tool shank or the implement frame so a removable pin could be inserted in appropriate aligned holes in the tool and frame, thereby achieving the desired depth of tool penetration. A cotter pin or other keeper would be used to maintain the pin in its installed position in the selected holes. While the hole selection in such an adjustment device afforded a visual indication of working depth of the tool, the pins could be lost or misplaced.

Heretofore, various adjustable spacers have been provided for a variety of applications. In U.S. Pat. No. 4,256,211, issued Mar. 17, 1981 to Jury V. Katkov on a "Piston Stroke Adjusting Arrangement for Disc-Type Friction Clutches and Brakes", the piston stroke is adjusted by use of a spacer held in a groove and having radially running recesses of different depths and a cooperating shiftable abutment. In U.S. Pat. No. 3,830,484 issued Aug. 20, 1974 to Stephen A. Bright and Robert E. Kress for an "Adjustable Device for Improved Clamping Means", a pair of stepped bodies, each with two series of steps, can be rotatably adjusted relative to one another thereby bringing different steps into abutment to change the axial length of the adjustment device.

OBJECTS AND BRIEF SUMMARY OF THE INVENTION

It is a primary object of this invention to provide an implement frame height adjusting device which does not use removable pins which can become separated and lost and does not use threads which can jam because of foreign material or rust.

It is a further object of this invention to provide an adjusting device of the character mentioned in the previous paragraph which does not change adjustment of its own accord during operation of the implement in which used.

It is a further object of this invention to provide an adjusting device of the spacer type which is compact, durable, easy to manufacture, inexpensive and manually adjustable to a large number of incremental settings.

These objects and advantages are achieved by using the invention in earth engaging agricultural equipment such as a planter having a gauge wheel mounted on the planter frame by an adjustable support structure including an adjusting device operable to adjust the vertical position of the planter frame relative to the gauge wheel. The adjustable support structure may include a vertical rod extending upwardly through a vertical opening in the frame and presenting a pair of diametrically opposite and radially extending projections which are spaced vertically above the frame surface interrupted by the vertical opening. The adjusting device interposed between the projections on the rod and the frame abutment surface includes two spacer parts. One part is a collar surrounding the rod and presenting a pair of diametrically opposite and upward facing abutments. The other part is an annular knob having a central axial opening through which the rod extends. The knob has at least two series of circumferentially spaced steps on its exterior, each series of steps including a plurality of downwardly facing and axially spaced abutment surfaces, with corresponding pairs of abutment surfaces engageable with the abutments on the collar. The knob also includes a plurality of pairs of diametrically opposite shoulders extending radially outward in relation to the axis of the central opening wherein each pair of shoulders presents radially extending and upward facing abutment faces at the same axial position along the opening which are selectively engageable by the projections. Each of the steps may be formed in a pocket between axially extending flanges which serve to maintain the knob in its selected position of adjustment on the collar. The abutment faces in the opening of the knob are preferably in notches or pockets between axially extending walls serving to maintain the projections in engagement with the selected pair of abutment faces. In the preferred embodiment of the invention, the projections are cylindrical and the abutment faces are concave surfaces.

BRIEF DESCRIPTION OF THE DRAWINGS

One embodiment of the invention is shown in the drawings, in which.

DETAILED DESCRIPTION OF THE DRAWINGS

Figure 1:
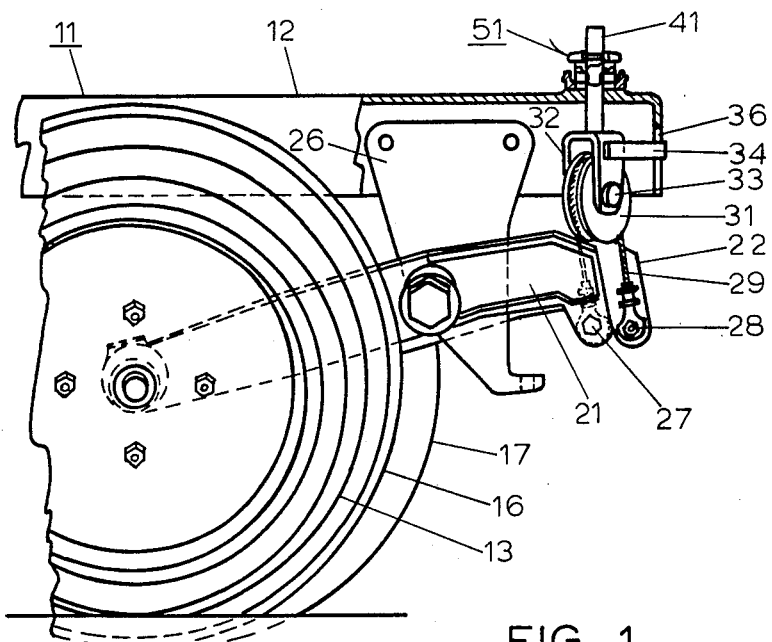
FIG. 1 is a partial side view of a planter showing an adjustable gauge wheel support structure with parts broken away for illustration purposes.
Figure 2:
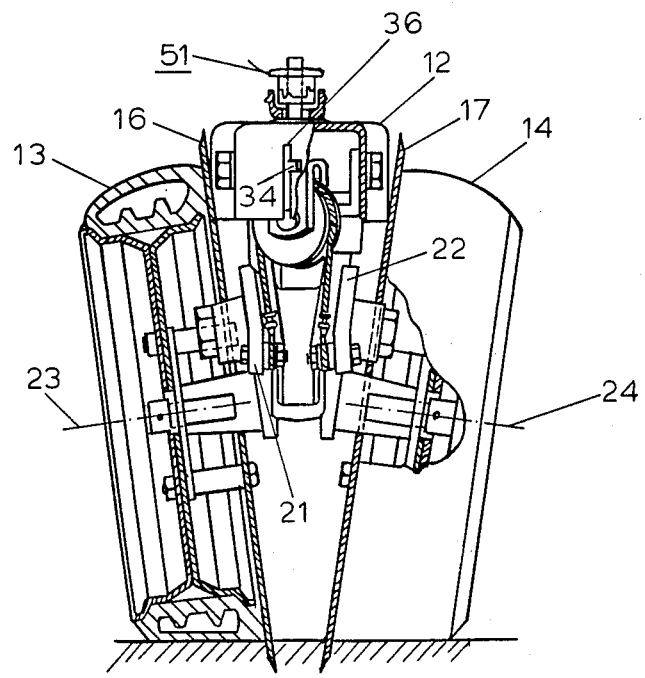
FIG. 2 is a rear view of the structure shown in FIG. 1 with parts broken away for illustration purposes.
Figure 3:
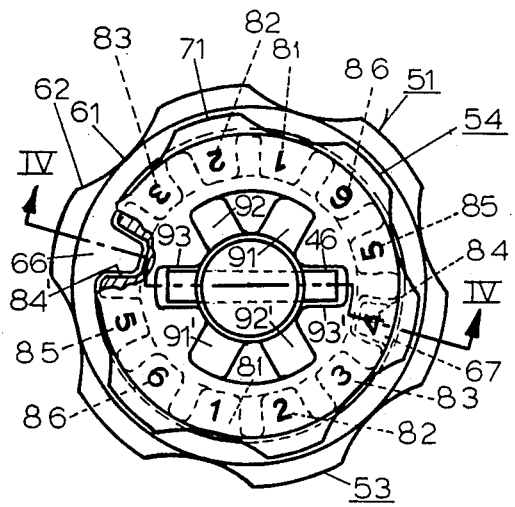
FIG. 3 is an elevation view of the adjusting device of this invention with parts broken away for illustration purposes.
Figure 5:
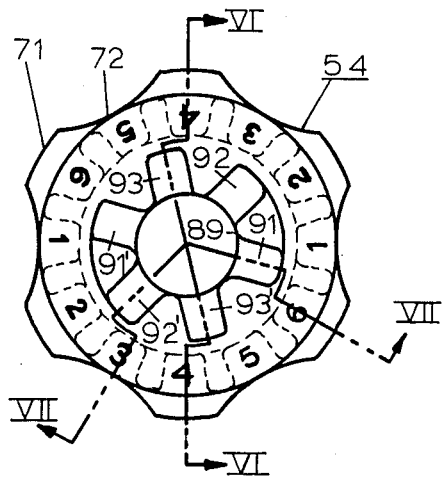
FIG. 5 is a top view of the knob part of the adjusting device.
Figure 4:
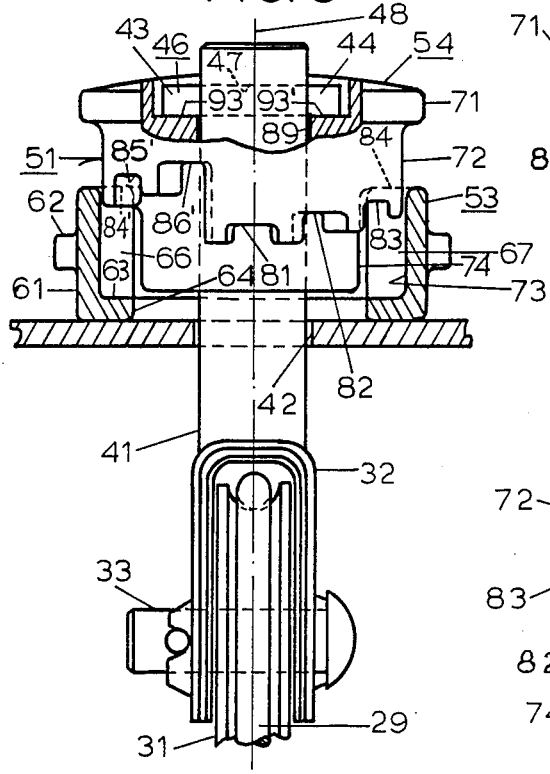
FIG. 4 is a view taken along the line IV—IV in FIG. 3.
Figure 6:
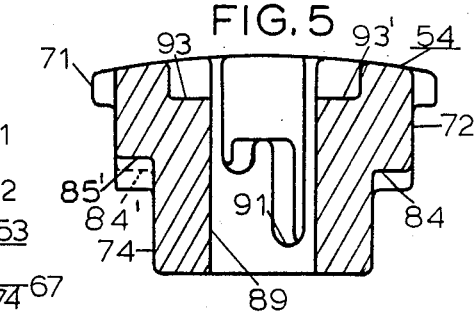
FIG. 6 is a view taken along the line VI—VI in FIG. 5.
Figure 7:
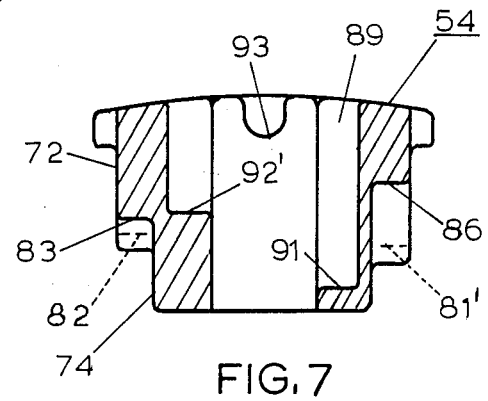
FIG. 7 is a view taken along the line VII—VII in FIG. 5.

FIGS. 1 and 2 show a part of a row crop planter 11, which is of the same general construction as that shown in my beforementioned U.S. Pat. No. 4,430,952. The planter includes a frame 12 which supports the furrow openers, the seed hopper and the singulating mechanism, none of which is illustrated.

The frame 12 is supported on the ground by a pair of rubber tired gauge wheels 13, 14 to which slicing discs 16, 17 are secured. The gauge wheels 13, 14 are rotatably mounted on the forward ends of a pair of walking beams 21, 22, the intermediate portions of which are pivotally connected on axes 23, 24 to a bracket 26 secured to and extending downwardly from the planter frame 12. The rear ends of the walking beams 21, 22 are connected by fasteners 27, 28 to opposite ends of a short length of cable 29 which is reaved over a grooved pulley 31 rotatably mounted on a bifurcated portion of a clevis 32 by a pin 33. A stabilizer bar 34 is welded at one of its ends to the clevis 32 and its other end extends through a vertical slot 36 in a rear vertical wall of the planter frame 12.

Referring also to FIGS. 3–7, the clevis 32 includes a rod portion or rod 41 extending upwardly from its bifurcated part through a vertical opening 42 in the frame 12. A pair of diametrically opposite and radially outward extending projections 43, 44 are provided by a cylindrical pin 46 press fit in a transverse bore 47 in the rod 41 perpendicular to its axis 48.

A depth adjusting device 51 is interposed between the upward facing flat surface 52 of the planter frame 12 and the projections 43, 44 on the rod 41 of the clevis 32. The adjusting device 51 is a two-part spacer which includes a collar part or collar 53 and a hollow cylindrical part or knob 54 mounted in adjustable telescoping nested relation to one another. The annular collar 53 includes a cylindrical wall 61 with scalloped flanges 62 extending radially outward therefrom to aid in manual gripping of the collar. A flat bottom wall 63 extends radially inward from the cylindrical wall 61, is integral therewith and presents a flat bottom surface in thrust transmitting engagement with the flat surface 52 of the frame 12. The bottom wall 63 has a vertical annular opening 64 which, in the installed condition of the adjusting device, is generally concentric with the rod portion 41 of the clevis 32 and with the opening 42 in the frame 12. A pair of diametrically opposite and vertically upward facing abutments 66, 67 are integrally formed on the inside of the cylindrical wall 61. The upward facing top surfaces of the abutments 66, 67 are at the same height as the top of the cylindrical wall 61 and therefore are coplanar with the latter.

The knob 54 of the adjusting device 51 has circumferentially spaced scalloped flanges 71 extending radially outward from the upper end thereof to facilitate manual gripping of the knob 54. The knob 54 has a large diameter outer cylindrical surface 72 which is slightly less in diameter than the inward facing annular surface 73 of the collar. A smaller diameter outer cylindrical surface 74 is presented by the lower portion of the knob 54. The diameter of the cylindrical surface 74 is less than the distance between the radially confronting surfaces of the abutments 66, 67. Two series of six steps 81–86 and 81'–86' are provided on the outer periphery of the knob 54. The steps 81–86, 81'–86' present downwardly facing and axially spaced abutment surfaces, corresponding pairs of which are selectively engageable with the abutments 66, 67. In the adjusted condition shown in FIGS. 3 and 4, the steps 84, 84' engage the abutments 66, 67, respectively. The steps 81–86, 81'–86' are formed in pockets between axially extending flanges which serve to maintain the knob in its selected position of adjustment. The steps 81–86, 81'–86' are sequentially spaced axially a predetermined amount, such as three millimeters. It should be understood that corresponding pairs of steps, for example, steps 84, 84' are at the same axial position relative to the axis 48 of the rod 41. A radially inward facing cylindrical surface 88 defines a central vertical opening 89 in the knob 54, the axis of which in its installed condition is the same as axis 48. Two series of three steps or shoulders 91–93 and 91'–93' are formed in the opening 89 and extend radially outward in relation to the axis of the central opening 89. Each corresponding pair of shoulders presents radially extending and upward facing abutment faces at the same axial position relative to the central opening and each such pair is selectively engageable by the cylindrical pin projections 43, 44. The shoulders 91–93, 91'–93' are notches and the abutment faces thereof are cylindrical surfaces at the bottom of the notches. Thus there are vertical walls at each side of the abutment faces which serve to maintain the transverse pin 46 in the selected one of the three pairs of corresponding notches 91, 91', 92, 92', 93, 93'. The axial distance between shoulders 91 and 92 is equal to the axial distance between shoulders 92 and 93 and that axial distance is approximately equal to six times the axial distance between adjacent steps of the series of steps 81–86 and 81'–86' on the outer periphery of the knob. With this adjusting device 51, it is possible to incrementally adjust the frame 12 vertically relative to the gauge wheels 13, 14 to eighteen different positions. Thus the adjustment range of the device is approximately 48 millimeters.

When making a vertical adjustment of the frame 12 relative to the ground, the operator causes the frame to be raised by raising the planter from the ground, which is normally achieved by raising the tool bar to which the planter is floatingly connected by appropriate power operated hydraulic actuators, not shown. The cable 29 will become slack permitting the operator to manually adjust the knob 54 and collar 53 of the adjusting device relative to one another and relative to the rod 41 of the clevis 32 to effect the desired depth of planting. The operator can visually ascertain which pair of shoulders the pin 46 is seated on. In order to apprise the operator of which pair of seats are seated on the abutments 66, 67, two series of numbers 1–6 are cast in the top of the knob above the two series of steps 81–86 and 81'–86'. This adjusting device has no pins or other loose parts which are likely to be lost and it has no threads which can become jammed with foreign material or become inoperable because of rust. The two main parts 53, 54 can be formed as aluminum castings, thus minimizing machining expense and avoiding rust. The operator is afforded an inexpensive, easy to operate, reliable adjustment device which affords accurate stepped adjustments of implement working or planting depth.

The embodiments of the invention in which an exclusive property or privilege is claimed are defined as follows:

1. An adjustable spacer for adjusting the axial position of a rod relative to a support transverse thereto, comprising:

an opening in said support through which said rod extends, diametrically opposite radially extending projections spaced from said support, a collar surrounding said rod and engaging said support, said collar having a pair of diametrically opposite abutments facing in the axial direction toward said projections and an annular knob having
- a central opening generally concentric with the axis of said knob through which said rod extends,
- at least two series of circumferentially spaced steps on the exterior of said knob, each series of steps including a plurality of axially spaced horizontal abutment surfaces facing toward said support, corresponding abutment surfaces of said series of steps being selectively engageable with said abutments, and
- a plurality of pairs of diametrically opposite shoulders extending radially outward in relation to the axis of said central opening, each pair of shoulders presenting radially extending abutment faces at the same axial position relative to said central opening and in selectively engageable relation to said projections.

2. The spacer of claim 1 wherein each of said steps is formed in a pocket between axially extending flanges which serve to maintain said knob in its selected position of adjustment on said collar.

3. The spacer of claim 1 wherein each of said abutment faces is a notch open in the axial direction toward said projections.

4. The spacer of claim 3 wherein each of said abutment faces is a concave surface and said projections are cylindrical.

5. In an agricultural planter having a frame, a gauge wheel and adjustable support structure mounting the gauge wheel on the frame including an adjusting device operable to adjust the vertical position of said frame relative to said gauge wheel, said adjusting device comprising:

a generally horizontal abutment surface on said frame a vertical opening in said frame interrupting said abutment surface a vertical rod extending upwardly through said opening and including diametrically opposite radially extending projections spaced vertically above said abutment surface of said frame, a collar surrounding said rod and having a pair of diametrically opposite and upward facing abutments and an annular depth adjusting knob having
- an axially extending opening generally concentric with the axis of said knob through which said rod extends,
- at least two series of circumferentially spaced steps on the exterior of said knob, each series of steps including a plurality of downwardly facing and axially spaced horizontal abutment surfaces, corresponding abutment surfaces of said series of steps being selectively engageable with said abutments, and
- a plurality of pairs of diametrically opposite shoulders extending radially outward in relation to the axis of said central opening, each pair of shoulders presenting radially extending and upward facing abutment faces at the same axial position relative to said central opening selectively engageable by said projections.

6. The agricultural planter of claim 5 wherein each of said steps is formed in a pocket between axially extending flanges which serve to maintain said knob in its selected position of adjustment on said collar.

7. The agricultural planter of claim 5 wherein each of said abutment faces is in an upwardly open notch.

8. The agricultural planter of claim 7 wherein each of said abutment faces is a concave surface and said projections are cylindrical.

* * * * *